(12) United States Patent
Kim et al.

(10) Patent No.: US 7,451,253 B2
(45) Date of Patent: Nov. 11, 2008

(54) HIGH-SPEED DATA TRANSFER AND MULTITASKING METHOD FOR PORTABLE TERMINAL HAVING MASS STORAGE SECONDARY MEMORY

(76) Inventors: Sung Kee Kim, No. 203, Buyoung 2 Apt., Okgye-dong, Gumi-si, Gyeongsangbuk-do (KR); Ki Hyeong Lee, No. 108-2009, Seonggwangwoobang Town, 127, Chilseong 2 ga, Buk-gu, Daegu-si (KR)

( * ) Notice: Subject to any disclaimer, the term of this patent is extended or adjusted under 35 U.S.C. 154(b) by 191 days.

(21) Appl. No.: 11/482,696

(22) Filed: Jul. 10, 2006

(65) Prior Publication Data
US 2007/0174500 A1   Jul. 26, 2007

(30) Foreign Application Priority Data
Dec. 29, 2005   (KR)   ............ 10-2005-0132810

(51) Int. Cl.
G06F 3/00   (2006.01)
G06F 13/00   (2006.01)

(52) U.S. Cl. ............ 710/38; 710/62; 710/72; 710/313; 710/316; 711/115; 711/147

(58) Field of Classification Search ............ 710/31–38, 710/62–64, 72–74, 100, 104–106, 119–121, 710/300–307, 313–317; 711/115, 147–153; 709/212
See application file for complete search history.

(56) References Cited

U.S. PATENT DOCUMENTS

| | | | |
|---|---|---|---|
| 2003/0233509 A1 | 12/2003 | Chang | |
| 2004/0039876 A1* | 2/2004 | Nelson et al. | ............ 711/115 |
| 2004/0267988 A1 | 12/2004 | Zhang | |
| 2005/0010699 A1 | 1/2005 | Hung et al. | |
| 2005/0278558 A1* | 12/2005 | Chen | ............ 713/300 |
| 2006/0015826 A1* | 1/2006 | Shiozawa et al. | ............ 715/864 |
| 2006/0195543 A1* | 8/2006 | Kose | ............ 709/212 |

* cited by examiner

FOREIGN PATENT DOCUMENTS
WO   WO 00/60918   10/2000

*Primary Examiner*—Christopher B Shin
(74) *Attorney, Agent, or Firm*—Roylance, Abrams, Berdo & Goodman, LLP

(57) ABSTRACT

A portable terminal having a mass storage secondary memory and a method for the portable terminal, wherein high-speed data transfer between the mass storage secondary memory and an external apparatus is supported in a multitasking manner are provided. Between the portable terminal having the mass storage secondary memory and the external apparatus, the method of setting a data transfer path comprises setting a first data path so as to permit the mass storage secondary memory to operate according to internal control of the portable terminal, determining whether the portable terminal is connected with the external apparatus through a USB switcher, and if the portable terminal is connected with the external apparatus, determining whether a set command is input to set the mass storage secondary memory as a portable disk of the external apparatus. If the set command is input, the first data path is blocked, and a second data path is set to permit the mass storage secondary memory to operate according to external control exercised by the external apparatus. The portable terminal can perform a task operation in a multitasking manner independently of the ongoing data transfer between the mass storage secondary memory and the external apparatus, and high-speed data transfer between the mass storage secondary memory and the external apparatus is possible through a high-speed USB interface.

18 Claims, 9 Drawing Sheets

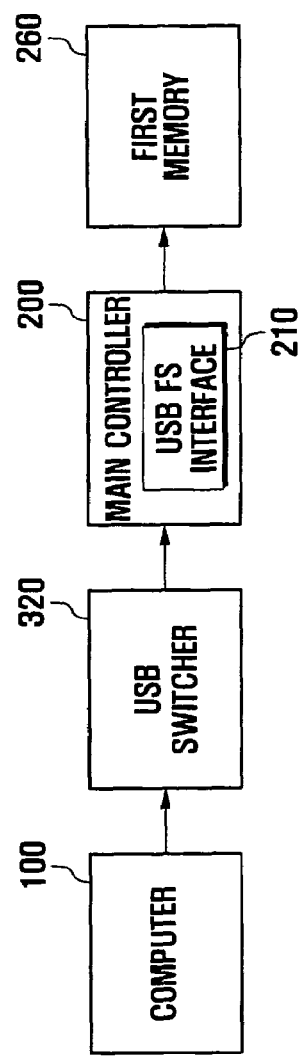
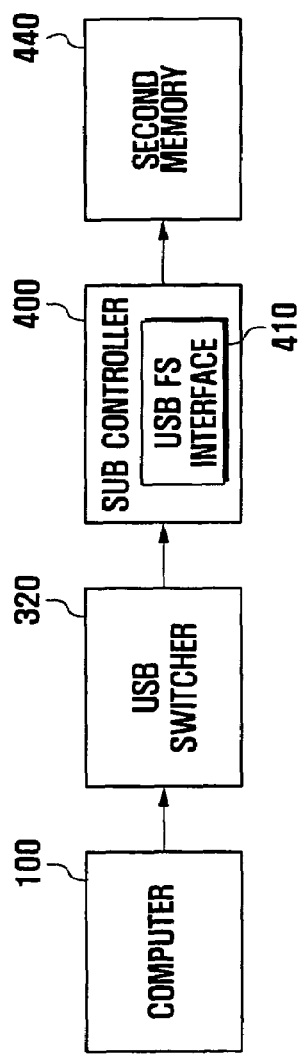

HIGH-SPEED DATA TRANSFER AND MULTITASKING METHOD FOR PORTABLE TERMINAL HAVING MASS STORAGE SECONDARY MEMORY

CROSS-REFERENCE TO RELATED APPLICATIONS

This application claims the benefit under 35 U.S.C. §119(a) of a Korean Patent Application Ser. No. 2005-0132810, filed in the Korean Intellectual Property Office on Dec. 29, 2005, the entire contents of which is hereby incorporated by reference.

BACKGROUND OF THE INVENTION

1. Field of the Invention

The present invention relates generally to a portable terminal having a mass storage secondary memory such as a hard disk. More particularly, the present invention relates to a portable terminal having a mass storage secondary memory where high-speed data transfer and multitasking can be supported by using the mass storage secondary memory as a portable disk of an external apparatus, and to a method of supporting high-speed data transfer and multitasking for the portable terminal.

2. Description of the Related Art

Recent rapid advances in information and communications technologies have allowed a mobile communication subscriber to use a conventional portable terminal to obtain traditional communication services such as voice telephone services and data communication services such as electronic mail, web browsing, and visual chatting services over wireless data networks. The mobile communication subscriber can also download various contents such as music files, moving images, still images, and games from favorite content providers and store the downloaded contents in the portable terminal for present and future enjoyment.

A portable terminal with the additional functionality of a camcorder, camera, or a moving picture experts group (MPEG) audio layer 3 (MP3) player has been developed. Therefore, a mobile communication subscriber can now use a single portable terminal to capture still or moving images, store them in the portable terminal, reproduce them with the portable terminal, or download and reproduce MP3 files.

Since memory used to store data for a conventional portable terminal is provided on an internal circuit board, the capacity of the memory is preset during the manufacturing processes. Therefore, the amount of data that the user can store in the memory is limited by the preset capacity. For example, the quantity of music files or still and moving images capable of being stored in the memory will depend on the preset capacity.

The portable terminal may have a flash memory for storing control programs to control an operation and function of the portable terminal, and a random access memory (RAM) for running the control programs. The flash memory is a nonvolatile memory used to store user data files as well as the control programs. Consequently, there is a need for a portable terminal with a large-capacity memory corresponding to diverse functions of the portable terminal and a large amount of user data.

FIG. 1 is a block diagram illustrating the configuration of a conventional portable terminal with a mass storage secondary memory.

The portable terminal comprises a main controller 20 for controlling ordinary communication functions of the portable terminal, and a sub-controller 40 for controlling added functions regarding, for example, multimedia.

The portable terminal also comprises a communication module 32, a key input unit 34, a basic information memory 36, a coder/decoder (CODEC) 38, a display unit 44, and a multimedia information memory 46. The communication module 32 is used for external communication over wireless networks according to the control of the main controller 20 and the key input unit 34 inputs a user command. The basic information memory 36 stores data concerning ordinary communication functions of the portable terminal such as use of voice telephone services. The CODEC 38 codes and decodes input/output audio signals, the display unit 44 displays operation states of the portable terminal, and the multimedia information memory 46 stores data concerning added functions of the portable terminal.

Due to a storage capacity limit of the basic memory 36 and multimedia information memory 46, the portable terminal further comprises a hard disk 60, which is a mass storage secondary memory capable of storing a large amount of data. The hard disk 60 is connected through a buffer 52 and hard disk controller 54 to the sub-controller 40. The buffer 52 acts to selectively output received data to the hard disk controller 54 according to the control of the sub-controller 40. The hard disk controller 54 controls drive of the hard disk 60, and data read and write operations thereof. The hard disk controller 54 writes data input from the sub-controller 40 through the buffer 52 on the hard disk 60, and reads data stored on the hard disk 60 and transfers the read data to the sub-controller 40 in response to a command from the sub-controller 40.

The main and sub controllers 20 and 40 each comprise an interface to an external electronic device, and can be connected through the interface to the external electronic device to send or receive certain data to or from the external electronic device. That is, the main and sub controllers 20 and 40 comprise universal serial bus (USB) full speed (FS) interfaces 22 and 42, respectively. The main controller 20 and sub-controller 40 are connected to a USB interface of a computer 10 to send data to the computer 10 or to receive data from the computer 10. The USB FS interfaces 22 and 42 support the FS data rate of the USB version 2.0, whose maximum data rate is 12 Mbits/sec.

Therefore, the main controller 20 can be connected through the USB FS interface 22 to the computer 10 via a USB cable, and can send or receive data related to ordinary voice telephone services such as a telephone number file and a ring tone file to or from the computer 10 at a data rate of 12 Mbits/sec, respectively.

The sub-controller 40 can be connected through the USB FS interface 42 to the computer 10 via a USB cable, and can send or receive multimedia data such as MP3 music files and photographed images to or from the computer 10 at a data rate of 12 Mbits/sec, respectively.

The main and sub controllers 20 and 40 may set a portable disk mode, in which they store data received through the USB FS interfaces 22 and 42, respectively, on the hard disk 60.

FIG. 2 illustrates a data transfer path from the connected computer to the portable terminal. The illustrated data transfer path denotes a path for storing data received through the USB FS interface 22 of the main controller 20 on the hard disk 60.

Referring to FIG. 2, data is transmitted from the computer 10 via a USB cable through the USB FS interface 22 to the main controller 20. The data is then transmitted through the sub-controller 40, buffer 52, and hard disk controller 54 to the hard disk 60.

FIG. 3 illustrates another data transfer path from the connected computer to the portable terminal. The data transfer path denotes a path for storing data received through the USB FS interface 42 of the sub-controller 40 on the hard disk 60.

Referring to FIG. 3, data is transmitted from the computer 10 via a USB cable through the USB FS interface 42 to the sub-controller 40. The data is then transmitted through the buffer 52 and hard disk controller 54 to the hard disk 60.

When the hard disk 60 of the portable terminal is used as a portable disk of the computer 10 acting as a host, data transfer is performed under the control of the main controller 20 and/or sub-controller 40. This facilitates the blocking of task operations of the portable terminal other than the data transfer. That is, in the portable disk mode of the conventional portable terminal, data transmission and reception operations involving the hard disk 60 are possible. Therefore, the portable disk mode of the conventional portable terminal does not have the ability to support multitasking.

In the portable disk mode of the conventional portable terminal, data transfer between the computer 10 and the hard disk 60 is performed through the USB FS interface 22 of the main controller 20 or the USB FS interface 42 of the sub-controller 40. Data transferred in this manner results in the data transfer rate being lowered to the maximum FS data rate of 12 Mbits/sec and complex data transfer paths.

SUMMARY OF THE INVENTION

An aspect of exemplary embodiments of the present invention is to address at least the above problems and/or disadvantages and to provide at least the advantages described below. Accordingly, an aspect of an exemplary embodiment of the present invention is to provide a portable terminal that may have a mass storage secondary memory and a method for the portable terminal, wherein high-speed data transfer between the mass storage secondary memory and an external apparatus is possible in a portable disk mode.

Another object of an exemplary embodiment of the present invention is to provide a portable terminal that may have a mass storage secondary memory and a method for the portable terminal, wherein multitasking is supported independently of data transfer between the mass storage secondary memory and an external apparatus in a portable disk mode.

A further object of an exemplary embodiment of the present invention is to provide a portable terminal that may have a mass storage secondary memory and a method for the portable terminal, wherein a data transfer path between the mass storage secondary memory and an external apparatus can be easily set in a portable disk mode.

According to an exemplary embodiment of the present invention, a data transfer path setting method is provided to facilitate data exchange between a portable terminal with a mass storage secondary memory and an external apparatus. A first data path is set to permit the mass storage secondary memory to operate according to an internal control of the portable terminal. A determination is made as to whether the portable terminal is connected to the external apparatus. If the portable terminal is connected to the external apparatus, a determination is then made as to whether a set command is input to set the mass storage secondary memory as a portable disk of the external apparatus. If the set command is input, the first data path is blocked and a second data path is set to permit operation of the mass storage secondary memory according to an external control exercised by the external apparatus.

The data transfer path setting method may further comprise additional steps. A determination is made as to whether a task event occurred according to the internal control of the portable terminal during data transfer between the external apparatus and mass storage secondary memory through the second data path. If the task event occurred, the occurred task event is handled in a multitasking manner independently of the data transfer.

After the data transfer between the external apparatus and mass storage secondary memory through the second data path is completed, a determination may be made as to whether a release command is input to release the second data path. If the release command is input, the second data path is blocked and the first data path is set again.

The first data path may be set through the mass storage secondary memory, a secondary memory controller, and a buffer connected to the secondary memory controller. The secondary memory controller controls the mass storage secondary memory and the buffer has an output connection set to permit the mass storage secondary memory to operate according to the internal control of the portable terminal.

The second data path is set through a high-speed universal serial bus (USB) interface supporting a high-speed data rate. The high-speed USB interface may have a maximum data rate of 480 Mbits/sec. The second data path may be set through the mass storage secondary memory, the secondary memory controller, and the high-speed USB interface connected to the secondary memory controller with an output connection set to permit the mass storage secondary memory to operate according to the external control exercised by the external apparatus.

The mass storage secondary memory may be a hard disk.

According to another exemplary embodiment of the present invention, a portable terminal is provided. The portable terminal comprises a mass storage secondary memory, a secondary memory controller, a buffer, a high-speed interface, a connection switcher, and a sub-controller. The secondary memory controller controls an operation of the mass storage secondary memory and the buffer selectively sets the output connection to the secondary memory controller to permit the mass storage secondary memory to operate according to internal control of the portable terminal. The high-speed interface selectively sets the output connection to the secondary memory controller to permit the mass storage secondary memory to operate according to the external control outside the portable terminal. The connection switcher senses the connection of an external apparatus exercising the external control and outputs data input from the external apparatus to a data path set corresponding to the path setting. The sub-controller blocks the output connection of the buffer, sets the output connection of the high-speed interface, and initializes the secondary memory controller to permit the mass storage secondary memory to operate according to the external control exercised by the external apparatus, in response to a set command to selectively set a connection between the external apparatus and mass storage secondary memory after connection of the external apparatus to the connection switcher.

The portable terminal may comprise a main controller for handling an occurred task event in a multitasking manner independently of the data transfer if the task event occurs according to the internal control of the portable terminal during data transfer between the external apparatus and mass storage secondary memory.

According to an exemplary implementation, after completion of the data transfer between the external apparatus and mass storage secondary memory and in response to an input command, the sub-controller blocks the output connection of the high-speed interface, re-sets the output connection of the buffer, and re-initializes the secondary memory controller to permit the mass storage secondary memory to operate according to the internal control.

According to an exemplary implementation, the high-speed interface is a high-speed universal serial bus (USB) interface supporting a high-speed data rate, and the high-speed USB interface may have a maximum data rate of 480 Mbits/sec. The mass storage secondary memory may be a hard disk.

According to an exemplary implementation, the connection switcher is a USB switcher for sensing the connection of the external apparatus via a USB cable and outputting the data from the external apparatus through the set data path to at least one of the main controller, the sub-controller and the high-speed interface.

The main controller and sub-controller may each comprise a USB full-speed (FS) interface supporting a USB FS data rate. The USB FS interface may have a maximum data rate of 12 Mbits/sec.

According to an exemplary embodiment of the present invention, when the hard disk is set as a portable disk controlled by an external apparatus, internal association between the hard disk and portable terminal is blocked and the hard disk is set to operate as an independent portable disk of the external apparatus, thereby providing a multitasking capability to the portable terminal. This setting permits the portable terminal to operate independently of ongoing data transfer between the hard disk and the external apparatus in an independent portable disk mode. Additionally, when the hard disk is set in an independent portable disk mode which permits the hard disk to operate independently of the portable terminal, data transfer between the hard disk and the external apparatus is performed through the high-speed (HS) interface of a USB version 2.0 supporting a maximum data rate of 480 Mbits/sec. Thus, high-speed data transfer is possible through a high-speed USB interface in the independent portable disk mode of the portable terminal.

BRIEF DESCRIPTION OF THE DRAWINGS

The above and other exemplary objects, features, and advantages of certain exemplary embodiments of the present invention will be more apparent from the following description taken in conjunction with the accompanying drawings, in which:

FIG. 5 is a block diagram illustrating a data transfer path from a connected computer to the portable terminal of FIG. 4.

FIG. 6 is a block diagram illustrating another data transfer path from the connected computer to the portable terminal of FIG. 4.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
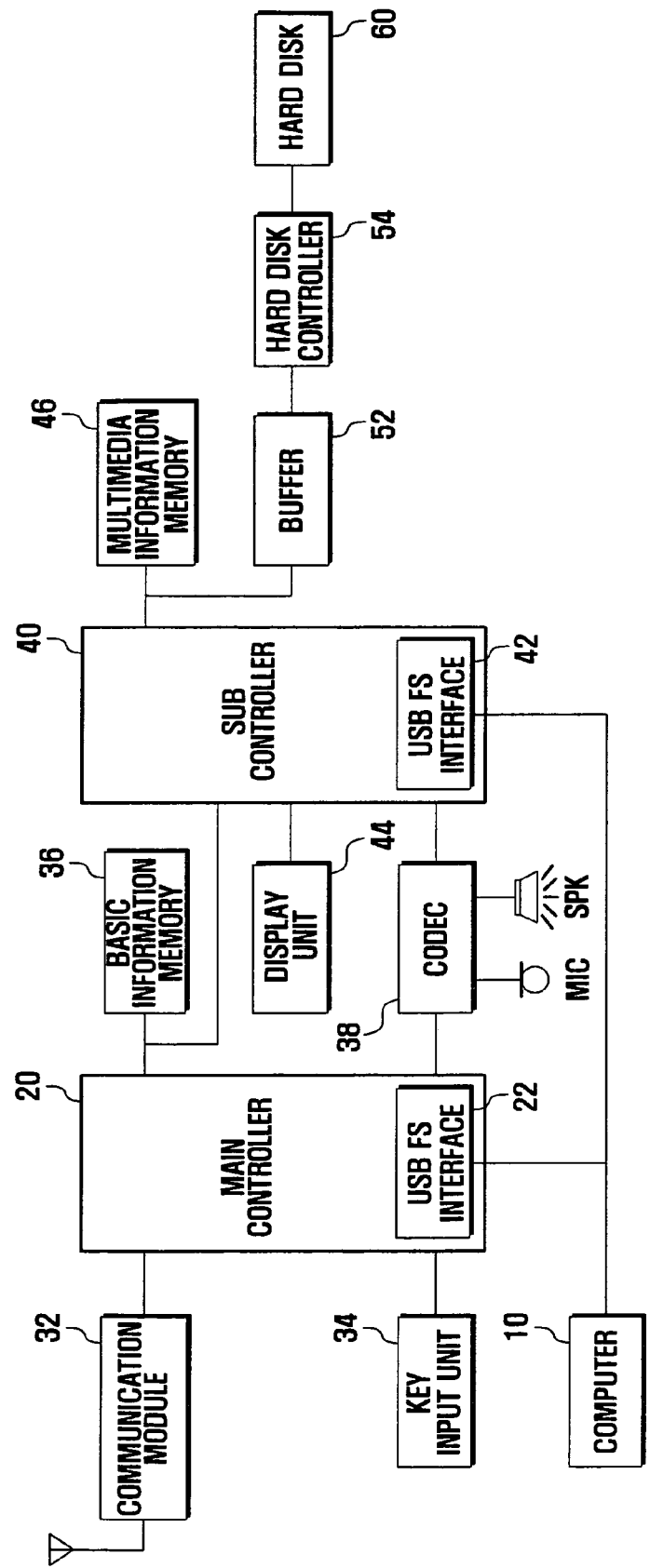
FIG. 1 is a block diagram illustrating the configuration of a conventional portable terminal having a mass storage secondary memory.
Figure 2:
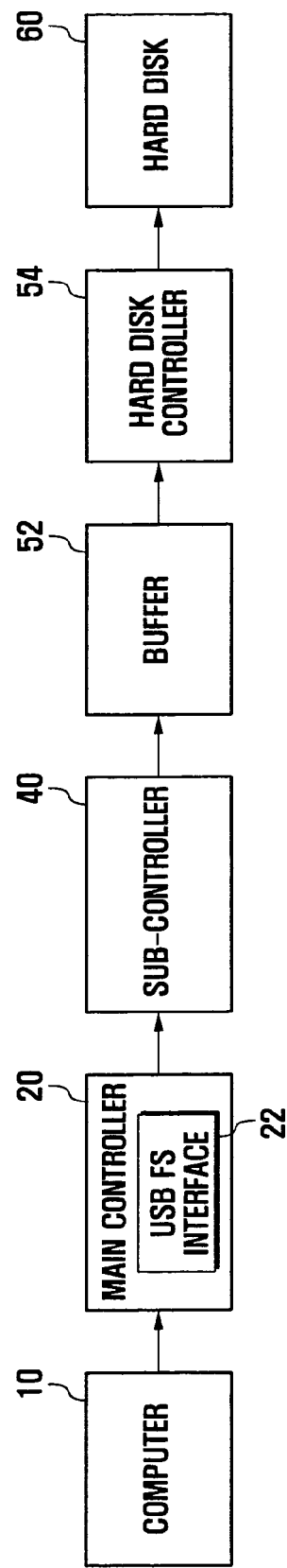
FIG. 2 is a block diagram illustrating a data transfer path from a connected computer to the portable terminal of FIG. 1.
Figure 3:
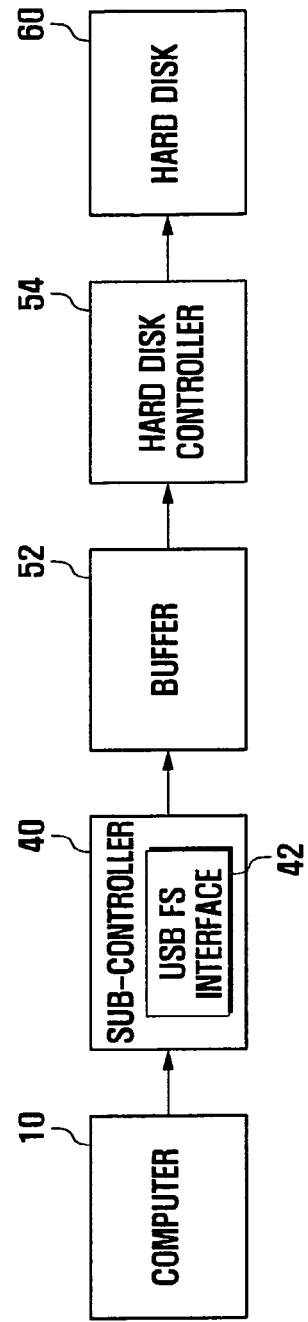
FIG. 3 is a block diagram illustrating another data transfer path from the connected computer to the portable terminal of FIG. 1.
Figure 4:
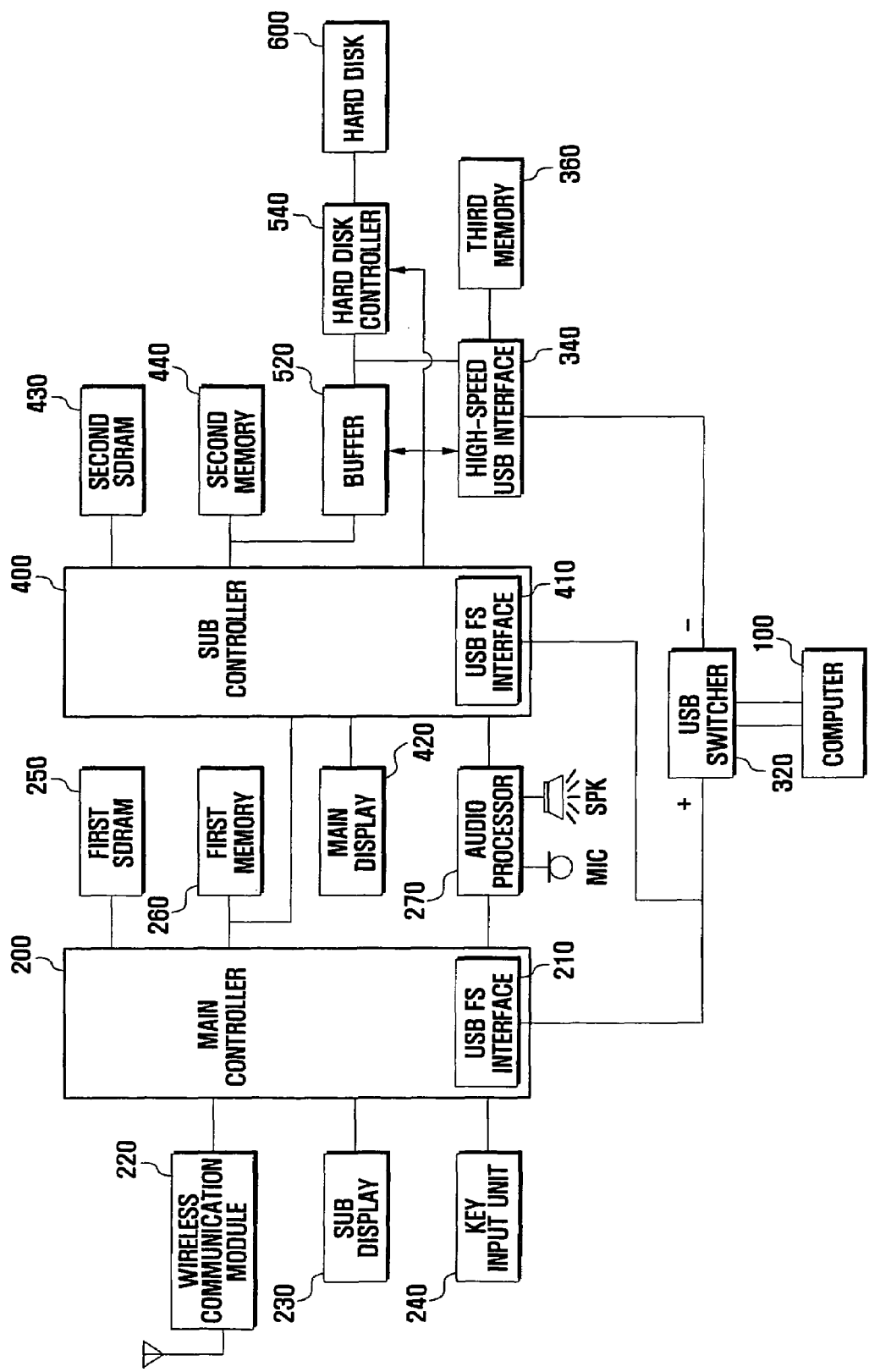
FIG. 4 is a block diagram illustrating the configuration of a portable terminal supporting high-speed data transfer and multitasking for a mass storage secondary memory thereof according to an exemplary embodiment of the present invention.

FIG. 4 is a block diagram showing the configuration of a portable terminal with a mass storage secondary memory that supports high-speed data transfer and multitasking for the mass storage secondary memory according to an exemplary embodiment of the present invention.

Referring to FIG. 4, the portable terminal comprises a main controller 200 for controlling ordinary communication functions of the portable terminal, and a sub-controller 400 for controlling added functions regarding, for example, multimedia.

The portable terminal also comprises a wireless communication module 220 for external communication over wireless networks according to the control of the main controller 200. A sub-display 230 displays operation states of the portable terminal in a standby mode and a key input unit 240 inputs a user command. A first memory 260 stores programs and associated data to operate and control the portable terminal for ordinary communication functions such as use of voice telephone services. A first SDRAM 250 loads the programs and associated data stored in the first memory 260. An audio processor 270 codes and decodes input/output audio signals. A main display 420 displays operation states of the portable terminal and a second memory 440 stores programs and associated data to operate and control the portable terminal for added functions. A second SDRAM 430 loads the programs and associated data stored in the second memory 440. NAND flash memories may be used as the first memory 260 and second memory 440.

The portable terminal comprises a hard disk 600, which is a mass storage secondary memory capable of storing a large amount of data, a hard disk controller 540 for controlling data read and write operations of the hard disk 600, and a buffer 520 for selectively blocking a data transfer path according to the control of the sub-controller 400.

In an exemplary embodiment of the present invention, the sub-controller 400 controls operations of the buffer 520 and hard disk controller 540.

The portable terminal according to an exemplary embodiment of the present invention comprises a high-speed USB interface 340 for supporting high-speed data transfer of the hard disk 600 in a portable disk mode, and a third memory 360 for storing programs and associated data to drive the high-speed USB interface 340. The third memory 360 may be an electrically erasable programmable read-only memory (EE-PROM). The high-speed USB interface 340 supports the high-speed (HS) data rate of the USB version 2.0, whose maximum data rate is 480 Mbits/sec.

The main and sub controllers 200 and 400 each comprise an interface to an external electronic device, and can be connected through the interface to the external electronic device to send certain data to the external electronic device or to receive certain data from the external electronic device. That is, the main and sub controllers 200 and 400 comprise USB FS interfaces 210 and 410, respectively. The main controller 200 and sub-controller 400 are capable of being connected to a USB interface of a computer 100 to send data to the computer 100 or to receive data from the computer 100. The USB FS interfaces 210 and 410 support the FS data rate of the USB version 2.0, whose maximum data rate is 12 Mbits/sec.

The portable terminal according to an exemplary embodiment of the present invention comprises a USB switcher 320. When the computer 100 is connected via a USB cable to the USB switcher 320 of the portable terminal, the USB switcher 320 transmits associated connection information to the sub-controller 400. Also, the USB switcher 320 transmits data received from the computer 100 to at least one of a selected main controller 200, sub-controller 400, and high-speed USB interface 340 based on the type of data and the setting of a data transfer path associated with the specific type.

That is, the USB switcher 320 determines whether it is connected via a USB cable to an external device such as the computer 100. If the USB switcher 320 is connected to the computer 100, the USB switcher 320 transmits associated connection information to the sub-controller 400.

The sub-controller 400 displays the connection information associated with the computer 100 on the main display 420, and displays information required for selecting a data transfer path between the computer 100 and a corresponding module through the main display 420.

Figure 7:
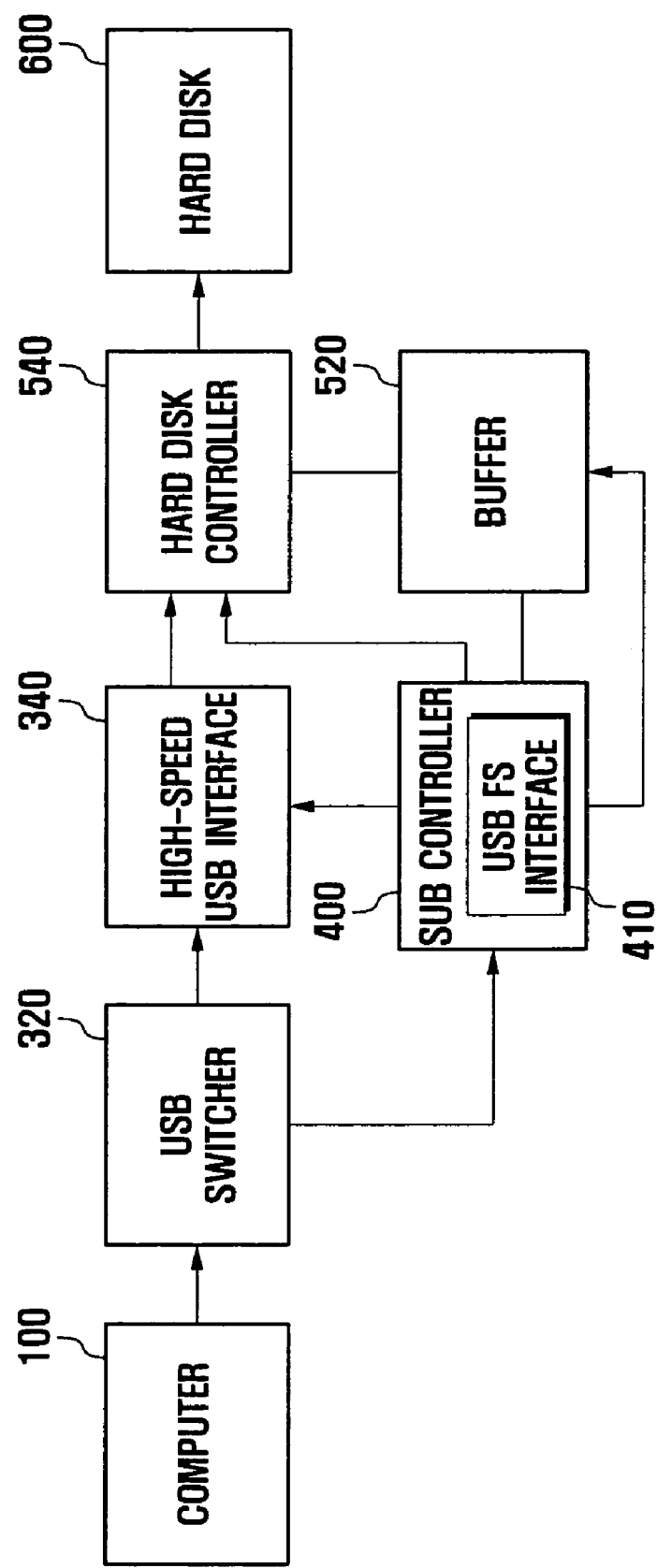
FIG. 7 is a block diagram illustrating another data transfer path from the connected computer to the portable terminal of FIG. 4.

FIGS. 5 to 7 illustrate examples of selectable data transfer paths according to an exemplary embodiment of the present invention.

FIG. 5 is a block diagram illustrating a first data transfer path from the connected computer to the portable terminal. The first data transfer path denotes a path for storing received data related to ordinary communication functions of the portable terminal in the first memory 260 through the USB FS interface 210 of the main controller 200.

Referring to FIG. 5, ordinary voice communication related data is transmitted from the computer 100 through the USB switcher 320 and the USB FS interface 210 to the main controller 200. The data is then transmitted from the main controller 200 to the first memory 260.

FIG. 6 is a block diagram illustrating a second data transfer path from the connected computer to the portable terminal. The second data transfer path denotes a path for storing received data related to multimedia functions of the portable terminal in the second memory 440 through the USB FS interface 410 of the sub-controller 400.

Referring to FIG. 6, multimedia data is transmitted from the computer 100 through the USB switcher 320 and the USB FS interface 410 to the sub-controller 400. The multimedia data is then transmitted from the sub-controller 400 to the second memory 440.

FIG. 7 is a block diagram illustrating a third data transfer path from the connected computer to the portable terminal. The third data transfer path denotes a path for the use of the hard disk 600 as a portable disk of the computer 100, namely a portable disk mode of the hard disk 600, through the high-speed USB interface 340.

If the data transfer path for the portable disk mode is selected, the sub-controller 400 blocks output connection of the buffer 520 to disable the buffer 520, initializes and facilitates the high-speed USB interface 340, and initializes the hard disk controller 540.

As a result, the connection between the hard disk controller 540 and sub-controller 400 through the buffer 520 is blocked, and thus a data transfer path is established. The connection permits the hard disk 600 to operate in a portable disk mode independently of other task operations of the portable terminal controlled by the main and sub controllers 200 and 400. That is, the data transfer path for the independent portable disk mode established according to an exemplary embodiment of the present invention is a path connecting the computer 100 to the hard disk 600. The connection is made through the USB switcher 320, high-speed USB interface 340 and hard disk controller 540. Accordingly, the hard disk 600 can operate as a portable disk of the computer 100 acting as a host.

After establishment of the independent portable disk mode, the USB switcher 320 transmits data received from the computer 100 to the high-speed USB interface 340, which can transfer data up to 480 Mbits/sec. Consequently, high-speed data transfer can be performed through the high-speed USB interface 340 in the portable disk mode of the portable terminal according to an exemplary embodiment of the present invention.

In an exemplary embodiment of the present invention, when a data transfer path involving the hard disk 600 through high-speed USB interface 340 is set for the portable disk mode, the output connection of the buffer 520 from the sub-controller 400 leading to the hard disk 600 is blocked. Hence, the hard disk 600 can operate as a portable disk independently of other task operations of the portable terminal, thereby enabling multitasking in the portable terminal.

In an exemplary embodiment of the present invention, if there is a call on the portable terminal while data is being transferred after establishment of the independent portable disk mode, the main controller 200 rings and the user can answer the call. Therefore, the portable terminal of an exemplary embodiment of the present invention can operate in a multitasking manner independently of the data transfer involving the hard disk 600 in a portable disk mode.

When a command to terminate the independent portable disk mode is input after completion of the data transfer to the hard disk 600, the sub-controller 400 unblocks the output connection of the buffer 520 to enable the buffer 520, disables the high-speed USB interface 340, and initializes the hard disk controller 540.

As a result, the connection between the computer 100 and hard disk 600 through the high-speed USB interface 340 is blocked, and the connection between the sub-controller 400 and the hard disk 600 through the buffer 520 is set.

When the portable terminal is powered up and turned on, the main controller 200 boots the portable terminal, identifies connection of the hard disk 600, accesses a file system of the portable terminal, and then updates lists of files stored in the memories 260, 440 and 360 as well as on the hard disk 600.

Afterwards, when the portable terminal is connected to the computer 100, the portable terminal operates in an independent portable disk mode. When the independent portable disk mode is terminated, the main controller 200 accesses the file system of the portable terminal and updates lists of changed files on the hard disk 600.

Figure 8:
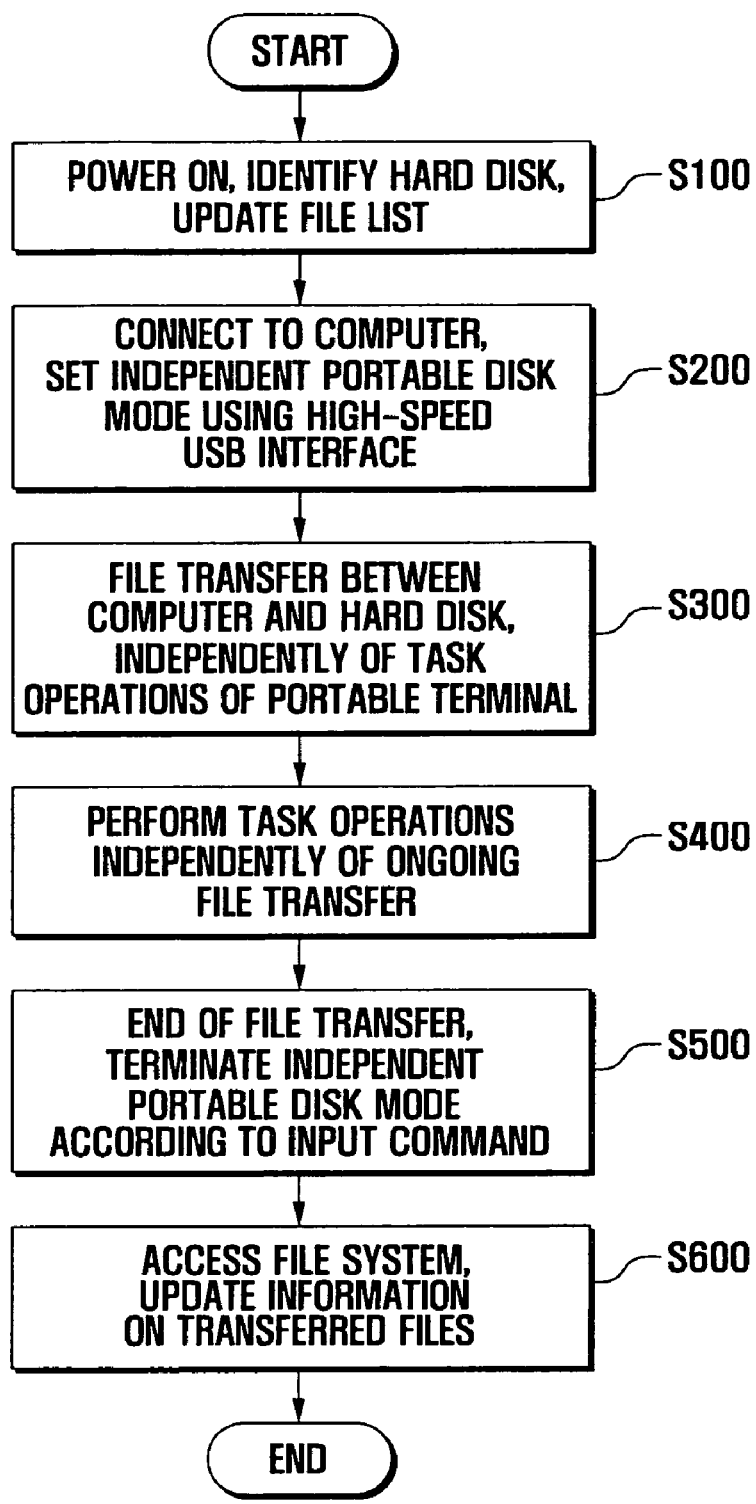
FIG. 8 is a flow chart illustrating a method of supporting high-speed data transfer and multitasking for a portable terminal having a mass storage secondary memory according to an exemplary embodiment of the present invention.

FIG. 8 is a flow chart illustrating a method of supporting high-speed data transfer and multitasking for the portable terminal with a mass storage secondary memory according to an exemplary embodiment of the present invention.

After the portable terminal is powered on, the main controller 200 identifies connection of the hard disk 600 and updates lists of files stored on the hard disk 600 (S100). When the USB switcher 320 is connected to the computer 100 via a USB cable, the sub-controller 400 sets an independent portable disk mode for high-speed data transfer between the hard disk 600 and computer 100 through the high-speed USB interface 340 (S200). In the independent portable disk mode, the computer 100 acts as a host of the connected hard disk 600, and the hard disk 600 acts as a local disk of the computer 100. At this time, selected files can be transferred between the computer 100 and hard disk 600, independently of a task operation of the portable terminal (S300).

While the files are being transferred between the computer 100 and hard disk 600, the main controller 200 and sub-controller 400 perform any requested task operation independently of the ongoing file transfer (S400). As described above, the portable terminal according to an exemplary embodiment of the present invention may have a multitasking capability, wherein it can perform task operations other than an ongoing portable disk mode operation involving the hard disk 600.

When the file transfer between the computer 100 and hard disk 600 is complete, the sub-controller 400 terminates the independent portable disk mode involving the hard disk 600 in response to an input command (S500). When the hard disk 600 is connected to the sub-controller 400 after termination of the independent portable disk mode, the main controller 200 accesses a file system to update lists of newly transferred files to the hard disk 600 (S600) and files stored on the hard disk 600 (S600).

Accordingly, when the portable terminal with the hard disk 600 is connected to the external computer 100, an independent portable disk mode is set using the high-speed USB interface 340. At this point, high-speed data transfer is possible between the computer 100 and hard disk 600. Since the portable terminal can perform a task operation independently of the ongoing data transfer, the portable terminal may have a multitasking capability.

Figure 9:
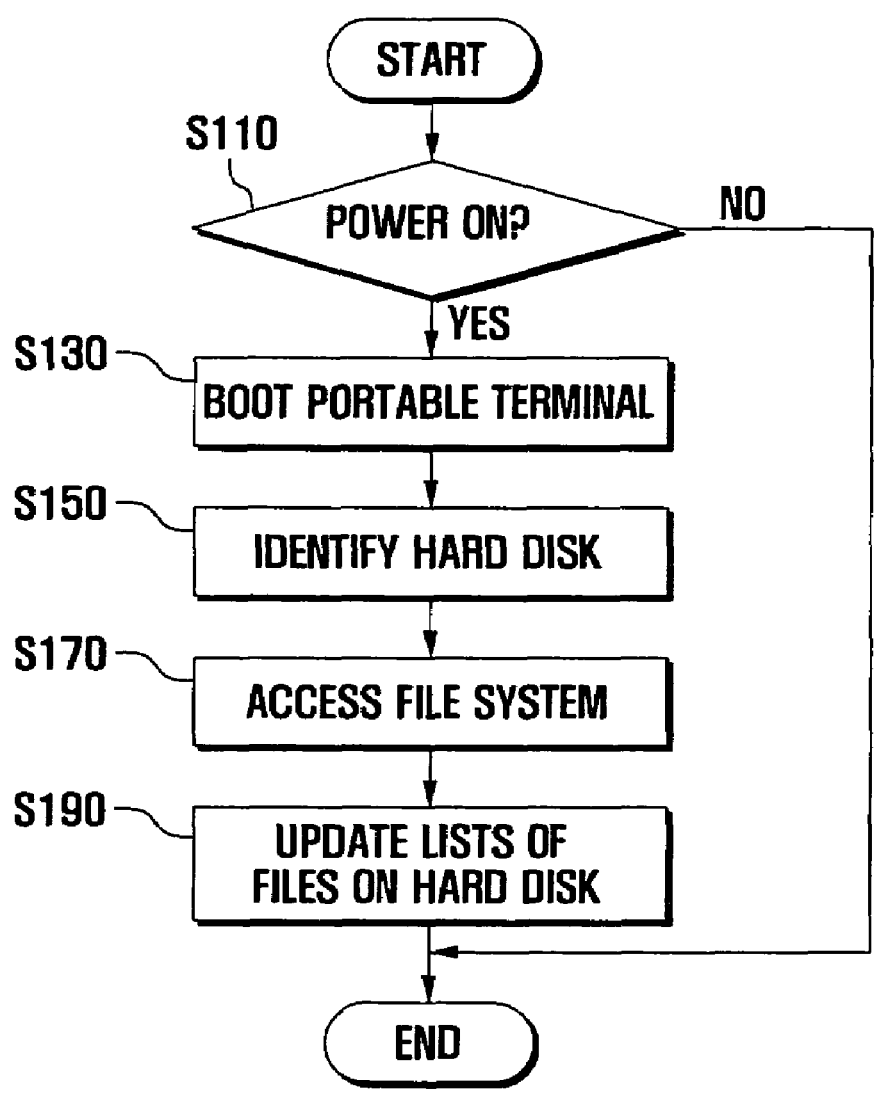
FIG. 9 is a flow chart illustrating a hard disk identification and file list update step in the method of FIG. 8.

FIG. 9 is a flow chart illustrating the hard disk identification and file list update step (S100) in the method of FIG. 8 in more detail.

When the power is on (S110), the main controller 200 boots the portable terminal (S130).

After booting the portable terminal, the main controller 200 identifies the hard disk 600 (S150), accesses a file system (S170), and updates lists of files stored on the hard disk 600 (S190).

Figure 10:
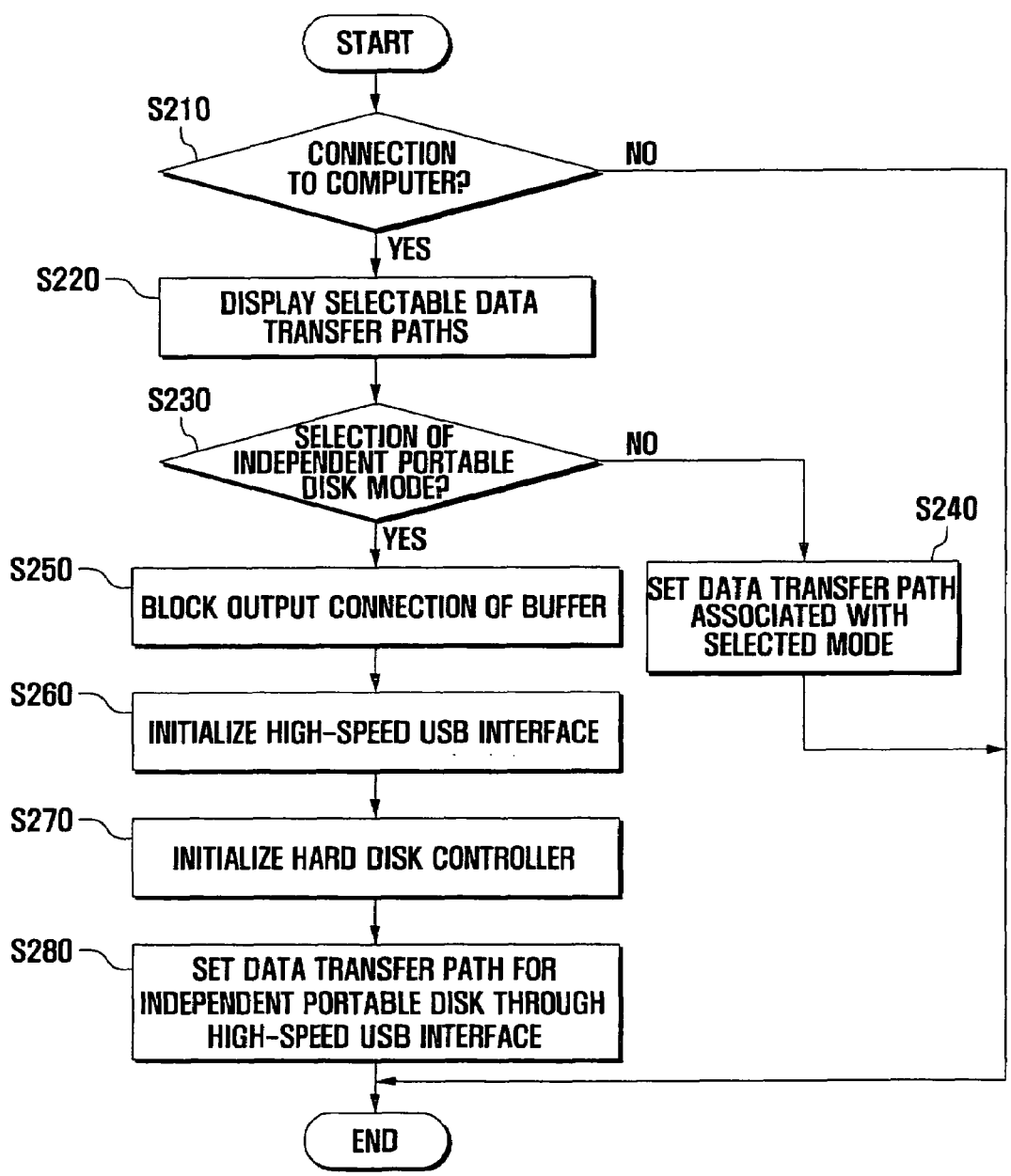
FIG. 10 is a flow chart illustrating an independent portable disk mode setting step in the method of FIG. 8.

FIG. 10 is a flow chart illustrating the independent portable disk mode setting step (S200) in the method of FIG. 8. In the exemplary embodiment of the present invention, the sub-controller 400 sets the independent portable disk mode.

The sub-controller 400 determines whether the computer 100 is connected through the USB switcher 320 (S210). If the computer 100 is connected through the USB switcher 320, the sub-controller 400 displays selectable data transfer paths to the computer 100 through the main display 420 (S220). That is, the sub-controller 400 displays information concerning user selectable data transfer paths connecting the computer to at least one of the main controller 200 through the USB FS interface 210, the sub-controller 400 through the USB FS interface 410, and the hard disk 600 through the high-speed USB interface 340.

If the independent portable disk mode using the data transfer path between the computer 100 and the hard disk 600 through the high-speed USB interface 340 is not selected (S230), the sub-controller 400 establishes the selected data transfer path and performs associated subsequent operations (S240).

If the independent portable disk mode is selected at step S230, the sub-controller 400 blocks the output connection of the buffer 520 (S250), activates and initializes the high-speed USB interface 340 (S260), and initializes the hard disk controller 540 to permit the hard disk 600 to operate according to the control of the computer 100 (S270). As a result, the data transfer path between the computer 100 and the hard disk 600 through the high-speed USB interface 340 is established, and the hard disk 600 can operate as a portable disk of the computer 100, independently of the portable terminal (S280).

Figure 11:
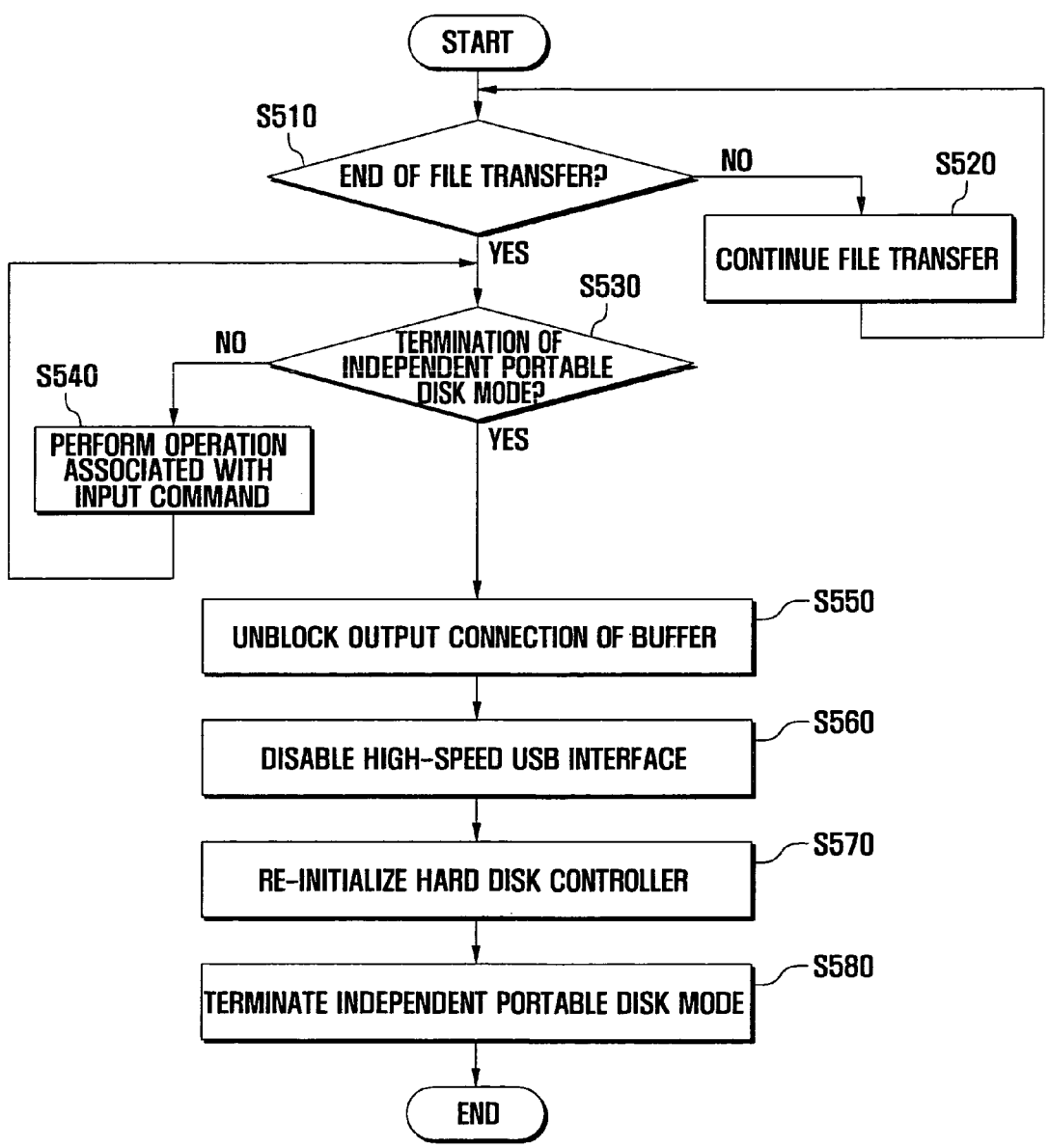
FIG. 11 is a flow chart illustrating in detail an independent portable disk mode termination step in the method of FIG. 8.

FIG. 11 is a flow chart illustrating the independent portable disk mode termination step (S500) in the method of FIG. 8.

The sub-controller 400 determines whether a file transfer between the computer 100 and the hard disk 600 is complete (S510). If the file transfer is not yet complete, the sub-controller 400 permits continuation of the file transfer (S520).

If the file transfer is complete, the sub-controller 400 determines whether the independent portable disk mode is to be terminated (S530). If an input command is not an independent portable disk mode termination command, the sub-controller 400 operates in response to the input command (S540).

If the independent portable disk mode termination command is input, the sub-controller 400 unblocks the blocked output connection of the buffer 520 (S550), and disables the high-speed USB interface 340 (S560).

The sub-controller 400 re-initializes the hard disk controller 540 so as to permit the hard disk 600 to operate according to the control of the sub-controller 400. This results in the termination of the independent portable disk mode. The independent portable disk mode is the mode in which the data transfer path is set between the computer 100 and the hard disk 600 through the high-speed USB interface 340. Once the independent portable disk mode is terminated, the hard disk 600 operates according to the control of the sub-controller 400 (S580).

Exemplary embodiments of the present invention aim to provide a portable terminal with a hard disk and a method for the portable terminal. When the hard disk is set as a portable disk controlled by an external apparatus, internal association between the hard disk and portable terminal is blocked and the hard disk is set to operate as an independent portable disk of the external apparatus. This provides a multitasking capability to the portable terminal. Consequently, the portable terminal can operate independently of ongoing data transfer between the hard disk and the external apparatus in an independent portable disk mode.

Also, data transfer between the hard disk and the external apparatus is performed through the high-speed (HS) interface of a USB version 2.0 supporting a maximum data rate of 480 Mbits/sec when the hard disk is set in an independent portable disk mode and permitted to operate independently of the portable terminal. Thus, high-speed data transfer is possible through a high-speed USB interface in the independent portable disk mode of the portable terminal.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A data transfer path setting method, comprising:
setting a first data path to permit a mass storage secondary memory of a portable terminal to operate according to an internal control of the portable terminal,
determining whether the portable terminal is connected to an external apparatus; and
if the portable terminal is connected to the external apparatus:
determining whether a set command is input to set the mass storage secondary memory as a portable disk of the external apparatus, and
if the set command is input, blocking the first data path, and setting a second data path to permit the mass storage secondary memory to operate according to external control exercised by the external apparatus,
wherein the second data path is set through the mass storage secondary memory, a secondary memory controller for controlling the mass storage secondary memory, a high-speed USB interface connected to the secondary memory controller, the high-speed USB interface comprising an output connection set to permit the mass storage secondary memory to operate according to the external control exercised by the external apparatus.

2. The data transfer path setting method of claim 1, further comprising:
determining whether a task event occurred according to the internal control of the portable terminal during data transfer between the external apparatus and the mass storage secondary memory through the second data path; and
handling the occurred task event independently of the data transfer when the task event occurs.

3. The data transfer path setting method of claim 2, further comprising:
determining, after completion of the data transfer between the external apparatus and the mass storage secondary memory through the second data path, whether a release command is input to release the second data path; and
blocking the second data path, and re-setting the first data path if the release command is input.

4. The data transfer path setting method of claim 3, wherein the first data path is set through the mass storage secondary memory, the secondary memory controller, and a buffer connected to the secondary memory controller, the buffer comprising an output connection set to permit the mass storage secondary memory to operate according to the internal control of the portable terminal.

5. The data transfer path setting method of claim 4, wherein the second data path is set through the high-speed USB interface supporting a high-speed data rate.

6. The data transfer path setting method of claim 5, wherein the high-speed USB interface comprises a maximum data rate of 480 Mbits/sec.

7. The data transfer path setting method of claim 1, wherein the mass storage secondary memory comprises a hard disk.

8. A portable terminal comprising:
a mass storage secondary memory;
a secondary memory controller for controlling an operation of the mass storage secondary memory;
a buffer for selectively setting an output connection to the secondary memory controller to permit the mass storage secondary memory to operate according to an internal control of the portable terminal;
a high-speed interface for selectively setting an output connection to the secondary memory controller to permit the mass storage secondary memory to operate according to an external control;
a connection switcher for sensing a connection of an external apparatus, exercising the external control, and for outputting data input from the external apparatus to a data path set corresponding to the path setting; and
a sub-controller for blocking the output connection of the buffer, setting the output connection of the high-speed interface, and initializing the secondary memory controller to permit the operation of the mass storage secondary memory to operate according to the external control exercised by the external apparatus, in response to a set command to selectively set connection between the external apparatus and mass storage secondary memory after connection of the external apparatus to the connection switcher.

9. The portable terminal of claim 8, further comprising:
a main controller for handling an occurred task event independently of the data transfer when the task event occurs according to the internal control of the portable terminal during data transfer between the external apparatus and mass storage secondary memory.

10. The portable terminal of claim 9, wherein the sub-controller blocks the output connection of the high-speed interface, re-sets the output connection of the buffer, and re-initializes the secondary memory controller to permit the mass storage secondary memory to operate according to the internal control after completion of the data transfer between the external apparatus and mass storage secondary memory and in response to an input command.

11. The portable terminal of claim 10, wherein the high-speed interface comprises a high-speed universal serial bus (USB) interface supporting a high-speed data rate.

12. The portable terminal of claim 11, wherein the high-speed USB interface comprises a maximum data rate of 480 Mbits/sec.

13. The portable terminal of claim 8, wherein the mass storage secondary memory comprises a hard disk.

14. The portable terminal of claim 8, wherein the connection switcher comprises a USB switcher for sensing the connection of the external apparatus via a USB cable and outputting the data from the external apparatus through the set data path to at least one of the main controller, the sub-controller and the high-speed interface.

15. The portable terminal of claim 14, wherein at least one of the main controller and sub-controller comprises a USB full-speed (FS) interface supporting a USB FS data rate.

16. The portable terminal of claim 15, wherein the USB FS interface comprises a maximum data rate of 12 Mbits/sec.

17. The data transfer path setting method of claim 2, wherein the handling of the occurred task event comprises multitasking.

18. The portable terminal of claim 9, wherein the occurred task event is handled by multitasking.

* * * * *

UNITED STATES PATENT AND TRADEMARK OFFICE
CERTIFICATE OF CORRECTION

| | | |
|---|---|---|
| PATENT NO. | : 7,451,253 B2 | Page 1 of 1 |
| APPLICATION NO. | : 11/482696 | |
| DATED | : November 11, 2008 | |
| INVENTOR(S) | : Sung Kee Kim and Ki Hyeong Lee | |

It is certified that error appears in the above-identified patent and that said Letters Patent is hereby corrected as shown below:

On the title page add item (73), as follows:

--Samsung Electronics Co., Ltd., Suwon-si, Republic of Korea.--

Signed and Sealed this

Twenty-ninth Day of December, 2009

David J. Kappos
*Director of the United States Patent and Trademark Office*